United States Patent [19]

Barker

[11] Patent Number: 5,261,269

[45] Date of Patent: Nov. 16, 1993

[54] LEAK DETECTOR FOR SWIMMING POOL

[76] Inventor: James A. Barker, 115 Lexington Rd., Bloomington, Ind. 47408

[21] Appl. No.: 869,624

[22] Filed: Apr. 16, 1992

[51] Int. Cl.$^5$ ............................................. G01M 3/20
[52] U.S. Cl. ..................................... 73/40.7; 222/174; 222/191
[58] Field of Search ................ 73/40.7; 222/174, 191, 222/214

[56] References Cited

U.S. PATENT DOCUMENTS

| | | | |
|---|---|---|---|
| 1,289,505 | 12/1918 | Mariner | 222/174 X |
| 3,880,162 | 4/1975 | Simmons | |
| 4,566,313 | 1/1986 | Monten | 73/40.7 |
| 4,634,027 | 1/1987 | Kanarvogel | 222/380 |
| 4,932,565 | 6/1990 | Paradiso | 222/174 |
| 4,938,063 | 7/1990 | Leighley | 73/40.7 |
| 5,065,690 | 11/1991 | Bontempo | 116/264 |

Primary Examiner—Hezron E. Williams
Assistant Examiner—Joseph W. Roskos
Attorney, Agent, or Firm—Barnes & Thornburg

[57] ABSTRACT

A pool leak detector for use in combination with a pole having a proximal end to be used as a handle and a distal end to be submerged in the pool, the detector comprising means for providing a container of dye carried on the distal end with the container having exit port means for conveying dye from the container. Battery-operated actuating means for releasing dye from the container through the port means is provided, the actuating means comprising a battery pack for supplying electrical energy carried on the proximal end of the pole and an electrically-operated actuator carried on the distal end of the pole. The container is a collapsible container, and means for placing the container under load to eject dye from the exit port means is provided.

10 Claims, 2 Drawing Sheets

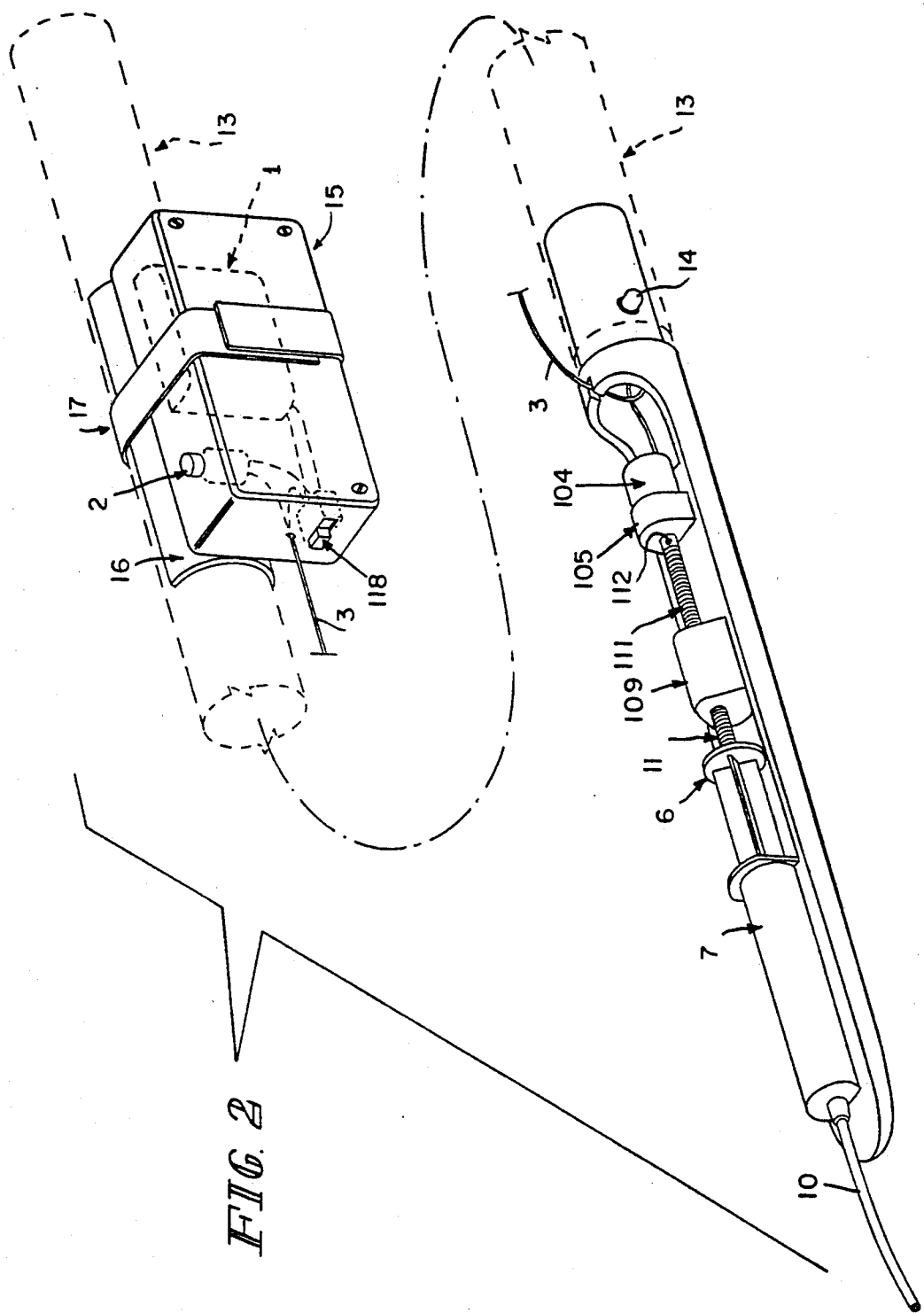

LEAK DETECTOR FOR SWIMMING POOL

BACKGROUND AND SUMMARY OF THE INVENTION

The present invention relates to leak detectors for swimming pools.

Sometimes, swimming pools leak. In fact, leakage is one of the most common problems with swimming pools. Leaks may occur anywhere. But they most often occur in the seams between prefab panels, in the filter lines, at corroded fittings, or at any scratch in vinyl-liner pools. Leaks are usually easy to find in above-ground pools, but can be difficult to locate in in-ground pools. A number of different leak detectors are shown in the prior art with which I am familiar. See, for instance, Bontempo U.S. Pat. No. 5,065,690 issued Nov. 19, 1991; and Monten U.S. Pat. No. 4,566,313 issued Jan. 28, 1986.

My invention is a device to assist the pool professional, or even the pool owner, in finding leaks. It dispenses small, controlled drops of dye precisely at suspected leaks. If a leak is present, the dye will be sucked through the crack. If no leak, the dye will just float there in the water. The operator injects some dye, and watches it for a few seconds to determine the presence or absence of a leak. My injector is electrically controlled. The controlled amount of dye is released by simply pressing a button. It will be seen as this description progresses that my invention is an improvement over the prior art.

My device comprises two basic parts attachable to a standard pool pole. An injector head attaches to the bottom end of a standard pool pole, in the same way that pool brushes and vacuum heads are attached. A battery case attaches to the top end of the pole, and never needs to be submerged. The injector head and battery case are connected by an electric cord and switch means.

One preferred injector head comprises a syringe with the dye (ordinary food coloring and water), a flow regulator, and an electrically-operated valve for releasing the dye. The flow regulator makes sure that the dye oozes out in a slow, calm manner. If the dye shoots out turbulently, it dissipates and cannot be tracked. The valve may be a conventional and readily available open/closed solenoid valve, protected from water intrusion.

The battery case comprises the batteries that energize the solenoid valve, and switch means that connects and disconnects the circuit. The case is preferably fabricated so it can strap to a standard pool pole.

Since the device is powered by a few flashlight batteries, there is no electric hazard, as there might be if house current is used to power the valve. The preferred device runs on four AA cells, providing 6 volts. This is an important feature, distinguishing the leak finder from anything powered by higher voltages or greater sources of electric power.

The preferred exit port means nozzle is a flexible tubing. This is far less likely to tear a vinyl-liner pool than is a rigid nozzle.

The advantageous features of my invention are as follows:

(a) The device is electric powered, requiring only the push of a button to inject a very controlled shot of dye deep down in the pool at the lower end of a long pole.

(b) The electric power necessary to run the device is low voltage and low amperage. Both are so low that there can be no safety hazard to people in the pool or to the person using the device, even if there is an electrical short in the device.

(c) The flow rate of the dye is controlled in a reliable, definite manner by the device, so that the injected drops of dye sit in the water as coherent, visible masses for as long as possible. Each button-push results in an identical injection action.

(d) The device employs exit port means including a flexible nozzle tube that cannot puncture vinyl-liner pools or gouge the caulk out of seams in concrete pools.

(e) The nozzle tube may be long and thin, to separate the dye injection point (and suspected leak) from eddy currents caused by movement of the bulk of the injector head.

(f) The power source and controls are located at the upper (handle) end of the pole, while the injector head is at the lower end, and the two are connected by a thin, flexible wire. This (a) allows the user to check the pool without entering the water, (b) keeps the power source and controls out of the water, and (c) balances the weight so there is less weight to be held up and maneuvered at the far end of the pole.

(g) The primary control (push-button switch) is simple-to-use and is mounted so it can be operated by the thumb of one hand while the fingers of that hand grip the pole. This is important because a 15 foot long pole needs to be gripped firmly with both hands if it is to be held near one end for more than a few seconds.

(h) The device easily attaches to a standard pool pole, but can also be lashed to other poles. Thus, the user can test any part of most private pools without entering the water. And most users can employ a pole that they already have.

It is an object of the present invention, therefore, to provide a pool leak detector for use in combination with a pole having a proximal end to be used as a handle and a distal end to be submerged in the pool. The detector comprises means for providing a container of dye carried on the distal end, the container having exit port means for conveying dye from the container into the water. A battery-operated actuating means for releasing dye from the container through the port means is provided, the actuating means comprising a battery pack for supplying electrical energy. The battery pack is carried on the proximal end of the pole, and an electrically-operated actuator for releasing the dye is carried on the distal end of the pole. The container may be a collapsible container and the detector may include means for placing the container under load to eject dye from the exit port means. The exit port means may comprise tube means leading away from the container, and the electrically-operated actuator may include a solenoid valve for opening and closing the tube means. In another embodiment, the electrically-operated actuator may comprise a motor and a driven shaft for engaging and loading the container when the motor is driven.

Another object of the present invention is to provide a detector comprising a battery pack for mounting on the proximal end of a pole and a dye-ejector pack for mounting on the distal end of the pole, the dye-ejector pack comprising a syringe to be filled with dye, the syringe having a plunger and exit port means. In this embodiment of the invention, means for loading the plunger to eject dye from the exit port means is provided, and electrically-operated solenoid valve means for controlling flow through the exit port means is also provided. In this embodiment, means for selectively electrically-connecting the solenoid valve means to the battery pack to release dye from the exit port means may include conventional connector wires and a pulsing switch. In one preferred embodiment of the invention, the loading means comprises a rubber element stretched to pull the plunger inwardly into the syringe. Also, in a preferred embodiment, the exit port means may comprise a first length of soft flexible tubing leading away from the syringe and further comprise means for adjustably controlling the rate of flow of dye through the tubing, the controlling means including means for controllably squeezing the tubing. In this embodiment, the first length of soft flexible tubing connects the syringe to the solenoid valve means and the exit port means further comprises a second length of soft flexible tubing leading away from the solenoid valve means to provide a nozzle through which dye is ejected into the water in the pool.

Still another object of the present invention is to provide electrically-operated means for driving the plunger to eject dye from the exit port means, the driving means comprising an electrically-operated motor and gear set and a threaded shaft driven by the gear set. The shaft is in driving engagement with the plunger such that, when the motor is driven, the plunger is driven into the syringe to eject dye from the exit port means. In this embodiment, means is provided for selectively electrically-connecting the motor to the battery pack to eject dye, the connecting means comprising connecting wires and switches.

BRIEF DESCRIPTION OF THE DRAWINGS

FIG. 2 is a fragmentary perspective view of an alternate embodiment.

DETAILED DESCRIPTION OF THE INVENTION

Figure 1:
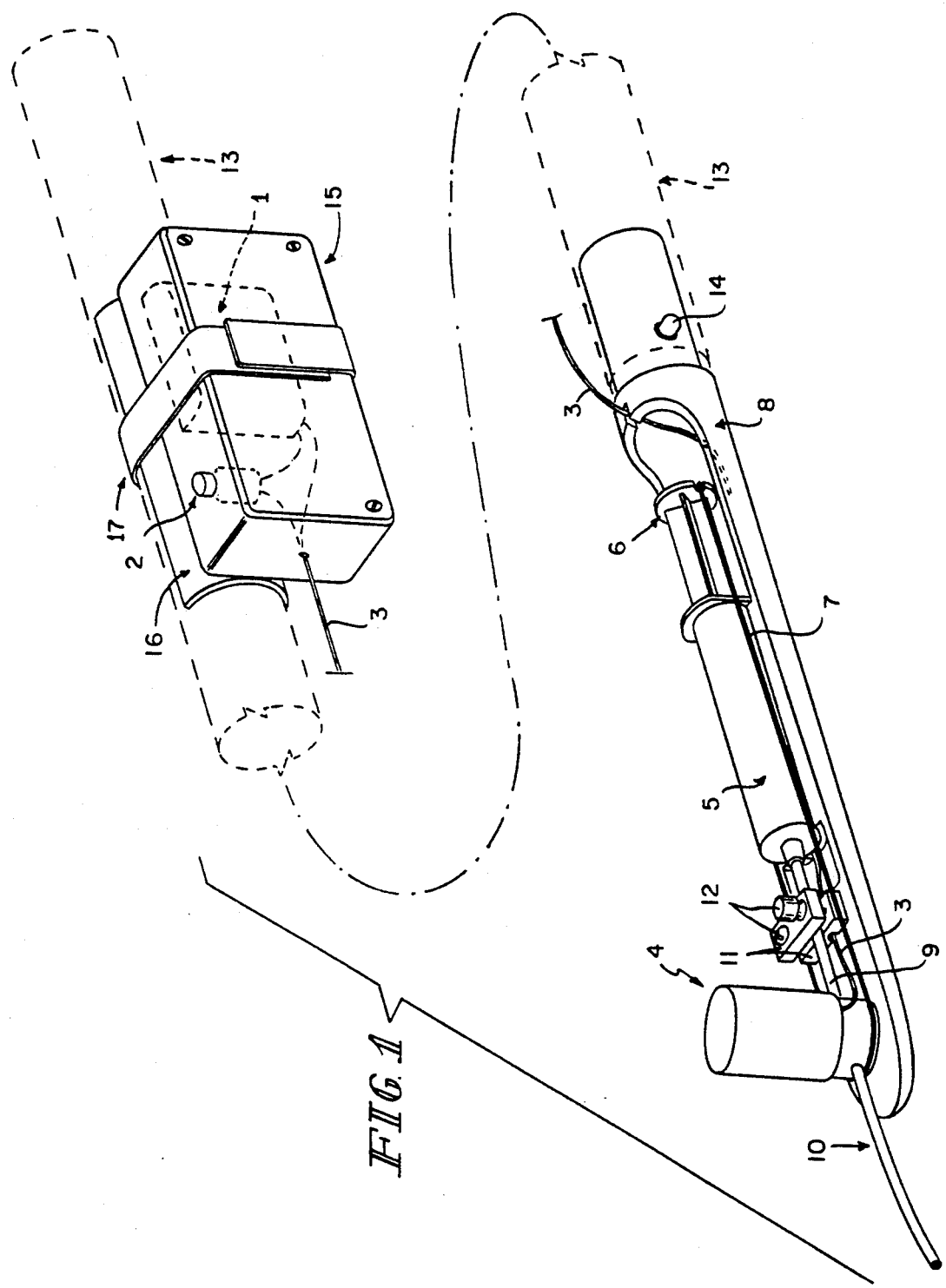
FIG. 1 is a diagrammatic perspective view showing one embodiment of my invention.

Flashlight batteries in battery holder 1 provide the electric power for the device. When push-button switch 2 is depressed, current flows through wires 3 to solenoid valve 4, which opens to allow the food coloring dye to flow through it. The dye is stored in syringe 5. A heavy rubber band 7 is stretched from any suitable anchorage near the forward tip of the base 8 and looped around the plunger 6, thus keeping the syringe under constant pressure. The dye rushes out whenever solenoid valve 4 opens. At that time, the dye travels through flexible tube 9, through the solenoid valve 4, and on through nozzle tubing 10, to exhaust into the surrounding pool water. Nozzle tubing 10 is preferably soft and flexible so that it will not puncture or tear pool liners when the device is handled unskillfully. A collapsible plastic bottle could be used to do the same job as the syringe, which is to store the dye and be inclined to expel it under the compressive force of the rubber band. The syringe 5 with the plunger 6 or any type of container which can be squeezed or loaded to eject dye may constitute "means for providing a container of dye" in accordance with the present invention. The rubber band or strap 7 may constitute "means for placing said container under load to eject dye" in accordance with the present invention.

The tubing 9 passes through a flow rate valve 11, which regulates the flow so that the dye emerges from the nozzle in a slow, oozing, placid manner. This is preferable because a fast, turbulent flow dissipates the dye, making its movement and drift hard to follow. The design shown uses two blocks that merely pinch the tube 9, gradually squeezing it shut as screws 12 are tightened. One of the screws 12 is a thumb-screw that does not require a screwdriver. Alternate designs for valve 11 work equally well and could be substituted. The important function is that the valve control and limit the flow rate of the dye.

The solenoid valve 4, flow rate valve 11, and syringe 5 are preferably all mounted on a base piece 8 which conveniently attaches, at its back end, to a standard pool pole 13 such as may be found at almost every swimming pool. Such poles commonly have an adjustable length that can reach up to fifteen feet. The pool pole is usually made to take attachments (pool brush, leaf-strainer, etc.) at its lower end through a standard fitting. The base piece 8 fits this standard pole as follows. The rear of the base piece 8 has the correct diameter to slide inside the pool pole 13. A spring clip 14 fits inside the base piece 8, with its nibs extending through holes in the base piece. When the base piece is slid into pool pole 13, the nibs also push through holes in the pole, locking the base piece 8 into the end of the pole. Variations on this attachment method exist, and the exact method is irrelevant to this invention. Spring clip 14 is a common item, available from several pool supply companies.

Batteries, battery holder 1, and switch 2 are mounted in a battery case 15. The case 15 is meant to be attached to the upper end of pool pole 13, so that the person using the device does not have to enter the pool. Instead, the user holds the upper end of the pool pole, maneuvers the lower end close to a suspected leak, and merely presses push-button switch 2 to gently inject some dye close to the leak. Keeping the user out of the water is important because motions of a person in the pool can create eddy currents that can mask the suction of small leaks.

The method of attaching battery case 15 to the pool pole (or to some substitute stick or pole) is not critical to this device, but the illustrated method is to attach a half-cylindrical piece 16 to the back of the battery case 15, and provide a hook & loop (velcro) strap 17 that lashes the case tightly against the pool pole. Rubber strips on piece 16 can increase the friction.

To refill the syringe 5, nozzle 10 is dipped into a cup of dye, switch 2 is depressed to open the solenoid, and plunger 6 is manually pulled out to suck up the dye. When full, switch 2 is released, trapping the dye in the syringe.

The alternate design of FIG. 2 is similar to that of the FIG. 1 design. The alternate design merely uses a different way to compress the syringe plunger and control the dye's flow rate.

Flashlight batteries in battery holder 1 provide the electric power. These are mounted inside battery case 15. When push-button switch 2 is depressed, current flows through wires 3 to submersible electric motor 104. The rotary motion of its shaft is slowed down through gear set 105. Motor 104 and reducing gears 105 are often sold as a unit called a "gearmotor". All-thread rod 111 slips over the output shaft of gear set 105, and is secured to the output shaft by setscrew 112. All-thread rod 111 passes entirely through a threaded hole in block 109, emerging on the other side to press against plunger 6 of syringe 7. The syringe contains a food coloring dye, which exhausts through long, flexible, nozzle tube 10. Syringe 7 and block 109 are mounted to the main base piece 8.

Motor 104 and gear set 105 are not mounted to piece 8. They are fastened only to all-thread rod 11, but motor and gear set have a flat base that touches the flat top surface of base 8. Thus, the motor and gear housing cannot rotate relative to base 8, but they can slide over it.

When push-button switch 2 is depressed, the electric current rotates the shaft of motor 104, which (acting through the reducing gears) turns all-thread rod 111. Rod 111 turns in its threaded hole in block 109, and advances towards the syringe, dragging motor 104 and gear set 105 with it. As rod 111 advances, it pushes plunger 6 into syringe 7, exhausting the dye at a rate predetermined by the motor speed, gear set, pitch of threads on rod 111, and syringe and nozzle diameters. These parameters are selected so that the dye emerges from the nozzle tube in a placid, oozing manner.

Double-throw double-pole switch 118 reverses the direction of current in wires 3. When the syringe has been exhausted, switch 118 is thrown to reverse the current. Then, push-button switch 2 is depressed to run motor 104 in reverse, backing itself and rod 111 away from the syringe. Then, nozzle tube 10 is dipped into a cup of dye, and plunger 6 is manually pulled out until it touches the tip of rod 111. This sucks dye into syringe 7. Switch 118 is returned to the "forward" position, and the device is again ready for use.

I claim:

1. A pool leak detector for use in combination with a pole, the pole having a proximal end to be used as a handle and a distal end to be submerged in the pool, said detector comprising means for containing a supply of dye carried on said distal end, said containing means having exit port means for conveying dye from said containing means, and battery-operated actuating means for releasing dye from said containing means through said port means, said actuating means comprising a battery pack for supplying electrical energy, said pack being carried on the proximal end of said pole, and an electrically-operated actuator carried on the distal end of said pole.

2. The invention of claim 1 in which said container is a collapsible container and including means for placing said container under load to eject dye from said exit port means, said exit port means comprising tube means leading from said container, said electrically-operated actuator including a solenoid valve for opening and closing said tube means.

3. The invention of claim 1 comprising adjustable flow-rate valve means for controlling the flow rate through said exit port means.

4. The invention of claim 1 in which said electrically-operated actuator comprises a motor and a driven shaft for engaging and loading said container when said motor is driven.

5. A pool leak detector for use on a pole having a proximal end serving as a handle and a distal end to be submerged in the pool, said detector comprising a battery pack for mounting on said proximal end, a dye-ejector pack for mounting on said distal end, said dye-ejector pack comprising a syringe to be filled with dye, said syringe having a plunger and exit port means, means for loading said plunger to eject dye from said exit port means, electrically-operated solenoid valve means for controlling flow through said exit port means, and means for selectively electrically connecting said solenoid valve means to said battery pack to release dye from said exit port means.

6. The invention of claim 5 in which said loading means comprises a rubber element stretched to pull said plunger inwardly into said syringe.

7. The invention of claim 5 in which said exit port means comprises a first length of soft flexible tubing leading away from said syringe and further comprising means for adjustably controlling the rate of flow of dye through said tubing, said controlling means including means for controllably squeezing said tubing.

8. The invention of claim 7 in which said first length of soft flexible tubing connects said syringe to said solenoid valve means and said exit port means further comprising a second length of soft flexible tubing leading away from said solenoid valve means to provide a nozzle through which dye is ejected into the water in the pool.

9. The invention of claim 8 in which said loading means comprises a rubber element stretched to pull said plunger inwardly into said syringe.

10. A pool leak detector for use on a pole having a proximal end serving as a handle and a distal end to be submerged in the pool, said detector comprising a battery pack for mounting on said proximal end, a dye-ejector pack for mounting on said distal end, said dye-ejector pack comprising a syringe to be filled with dye, said syringe having a plunger and exit port means, electrically-operated means for driving said plunger to eject dye from said exit port means, said driving means comprising an electrically-operated motor and gear set and a threaded shaft driven by said gear set, said shaft being in driving engagement with said plunger such that, when said motor is driven, said plunger is driven into said syringe to eject dye from said exit port means, and means for selectively electrically-connecting said motor to said battery pack.

* * * * *